United States Patent [19]
Simioni

[11] Patent Number: 5,764,330
[45] Date of Patent: Jun. 9, 1998

[54] DEVICE FOR INTERCONNECTING AND PIVOTING TWO COMPONENTS OF EYEGLASSES OR PROTECTIVE ELEMENTS FOR SPORTS

[75] Inventor: Luciano Simioni, Montebelluna, Italy

[73] Assignee: Killer Loop S.p.A., Pederobba, Italy

[21] Appl. No.: 493,601

[22] Filed: Jun. 22, 1995

[30] Foreign Application Priority Data

Jun. 27, 1994 [IT] Italy .................. TV94A0074

[51] Int. Cl.⁶ .............. G02C 5/14; G02C 5/00; G02C 5/22
[52] U.S. Cl. .......... 351/41; 351/116; 351/121; 351/149; 351/153; 16/228
[58] Field of Search .............. 351/41, 44, 111, 351/113, 116, 119, 121, 133, 140, 142, 143, 145, 146, 147, 148, 149, 150, 151, 153; 2/450, 451, 453; 16/228

[56] References Cited

U.S. PATENT DOCUMENTS

| | | |
|---|---|---|
| 2,671,379 | 3/1954 | Eloranta ................ 16/228 |
| 3,383,707 | 5/1968 | McNeill ................... 2/12 |
| 4,029,403 | 6/1977 | Harris ..................... 351/121 |
| 4,564,272 | 1/1986 | Kan ........................ 351/153 |
| 4,670,915 | 6/1987 | Evans ..................... 351/116 |
| 5,313,671 | 5/1994 | Flory ...................... 351/149 |
| 5,638,147 | 6/1997 | Wang-Lee ................ 351/140 |

FOREIGN PATENT DOCUMENTS

| | | |
|---|---|---|
| 0217763 | 4/1987 | European Pat. Off. . |
| 0656557 | 6/1995 | European Pat. Off. . |
| 2063918 | 12/1970 | France . |
| 24774100 | 9/1981 | France . |
| 2634909 | 2/1990 | France . |
| 9001718 | 2/1990 | WIPO . |
| 9429763 | 12/1994 | WIPO . |

Primary Examiner—Huy Mai
Attorney, Agent, or Firm—Guido Modiano; Albert Josif

[57] ABSTRACT

A device for interconnecting and pivoting two components of eyeglasses or protective elements for sports use. The device is constituted by a single flexible body that is detachably associable at at least one hole formed on one of the two components. The single body is provided with temporary engagement elements for the other one of the two components.

27 Claims, 6 Drawing Sheets

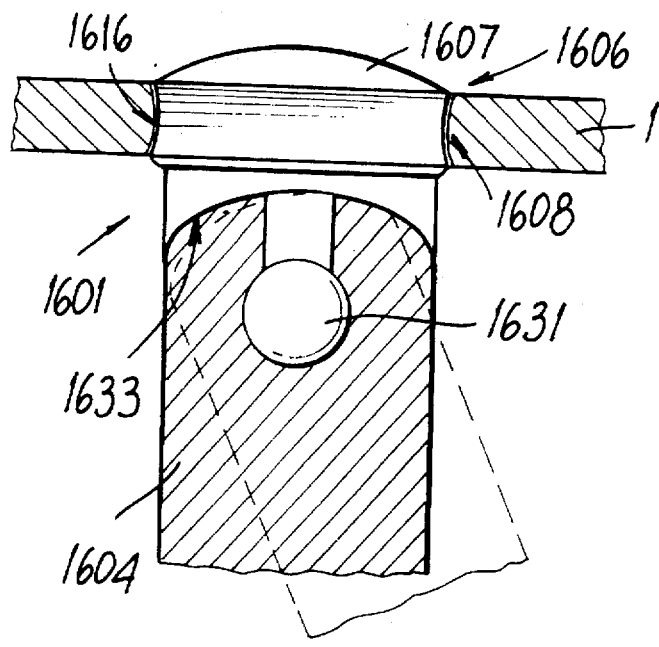
Fig. 24
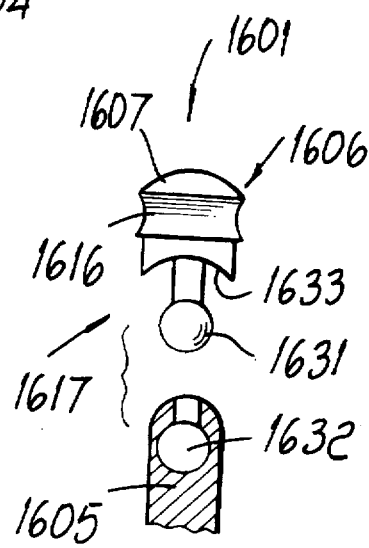
Fig. 23
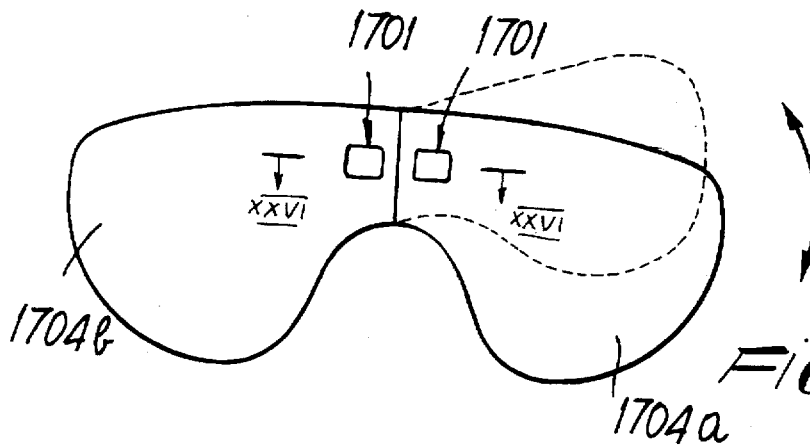
Fig. 25
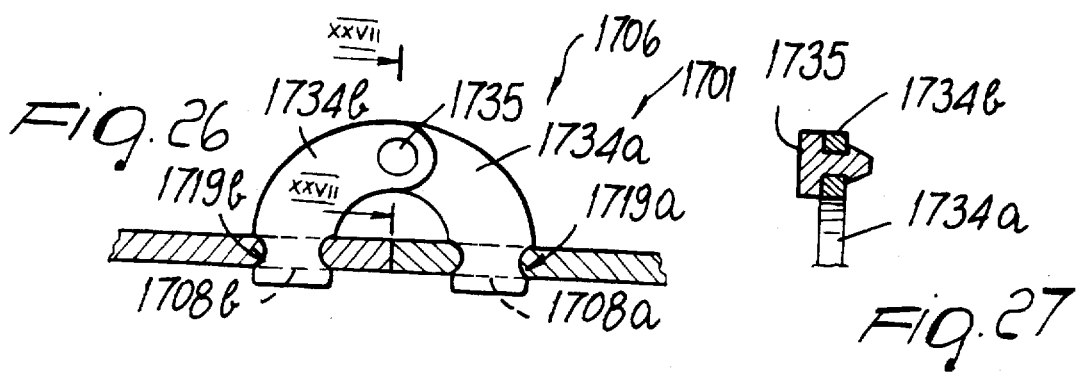
Fig. 26
Fig. 27

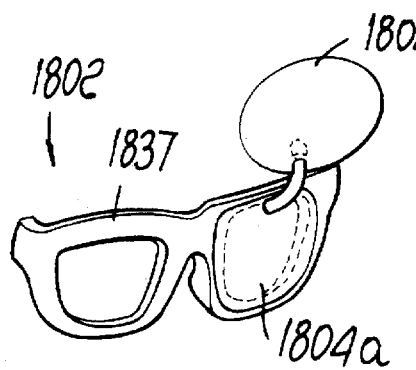
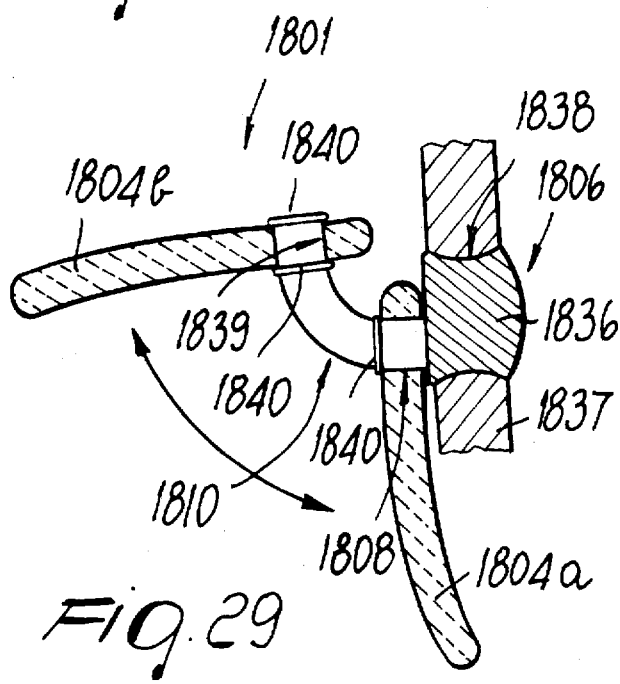
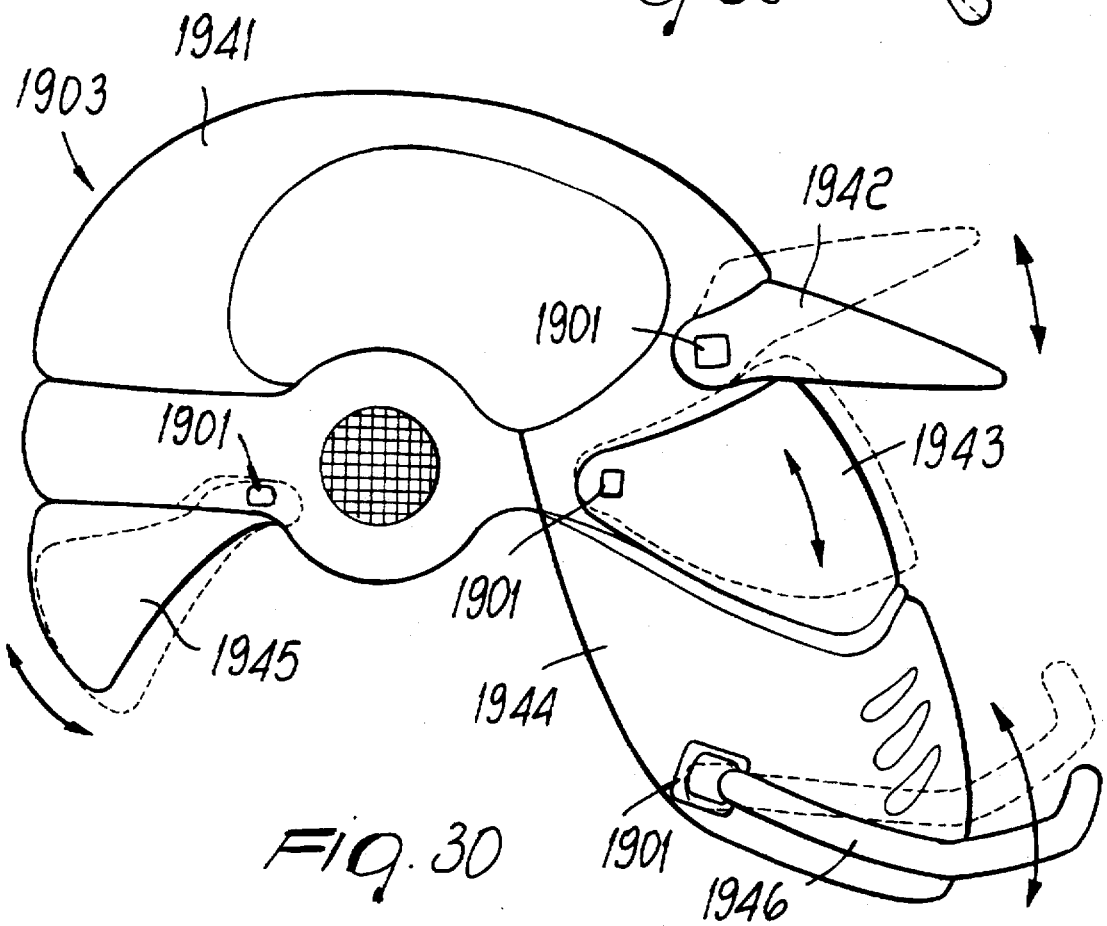

DEVICE FOR INTERCONNECTING AND PIVOTING TWO COMPONENTS OF EYEGLASSES OR PROTECTIVE ELEMENTS FOR SPORTS

BACKGROUND OF THE INVENTION

The present invention relates to a device for interconnecting and pivoting two components of corrective eyeglasses or sunglasses or glasses of the sports type such as skiing goggles, or of protective elements for sports, such as helmets etcetera.

Sports glasses are currently known which are constituted by a front formed by a curved element provided with a longitudinal seat for the snap-together insertion of the upper perimetric edge of a single lens or of a pair of lenses, if there is an intermediate bridge having also an engagement seat for the lateral edge of a lens.

Hinges for connection to temples are associated with the ends of said front.

It is also known to provide hinges constituted by two rotatably associated elements, the free ends of which are pressed together or are embedded, for example, in the temple and in the front; as an alternative, said two elements are formed or obtained directly at the ends of said temples and said front.

In the case of eyeglasses with metallic components, it is known to perform heat or ultrasonic welding operations to connect one another the two elements constituting the hinge.

It is also known, for eyeglasses made of plastics, to glue the components one another, and it is also known to obtain the hinges from the mold.

It is also known to connect one another two components of the hinge by riveting them.

The production of these known types of eyeglasses entails high manufacturing costs due to the required treatments, to the particular machines and to the special molds used to manufacture them.

Among other things, it is in fact necessary to provide appropriate seats on the front for the association of the lenses therewith, which besides occurs by deforming said front or by using coupling screws, and difficulties are accordingly encountered for example in replacing said lenses.

Furthermore, the components of the eyeglasses, once subjected to impacts leading to deformations or breakage of one or more of them, cannot be replaced without incurring costs that are higher than those for manufacturing the entire pair of eyeglasses, which is therefore usually thrown away in these cases.

Some of these drawbacks are also observed in skiing goggles, usually constituted by an element made of plastics which surrounds the user's front eye region; a single lens is associated with said element, which is provided with an elastic that is adapted to wrap around the rear part of the user's head.

SUMMARY OF THE INVENTION

The aim of the present invention is therefore to solve the described technical problems by eliminating the drawbacks of the known art and thus providing a device that allows to manufacture eyeglasses or protective elements for sports use having a limited number of components that can easily and quickly be assembled together.

Within the scope of this aim, an important object is to provide a device allowing easy and quick replacement of the eyeglasses components that may have been damaged, or according to aesthetic or functional requirements of the user.

Another object is to provide a device allowing the user himself to achieve this assembly and/or replacement of the components.

Another important object is to provide a device allowing to produce eyeglasses or protective elements for sports use without requiring particular treatments, thus allowing to use known machines and devices.

Another object is to provide a device reliable and safe in use and having low manufacturing costs.

This aim, these objects, and others which will become apparent hereinafter are achieved by a device for interconnecting and pivoting two components of eyeglasses or protective elements for sports use, characterized in that it is constituted by a single flexible body that is detachably associable at at least one hole that is formed on one of said two components and is provided with temporary engagement means for the other one of said two components.

BRIEF DESCRIPTION OF THE DRAWINGS

Further characteristics and advantages of the invention will become apparent from the detailed description of some preferred but not exclusive embodiments, illustrated only by way of non-limitative example in the accompanying drawings, wherein:

FIG. 23 is a view of the components of a seventeenth embodiment of the device in unassembled condition;

FIG. 24 is a partially sectional view of the device of FIG. 23 in assembled condition;

FIG. 25 is a front view of two lenses that are coupled one another by means of a device;

FIG. 26 is a sectional view, taken along the plane XXVI—XXVI of FIG. 25;

FIG. 27 is a sectional view, taken along the plane XXVII—XXVII of FIG. 26;

FIGS. 28 and 29 are views of an eighteenth embodiment of the device;

FIG. 30 is a view of a nineteenth embodiment of the device.

DESCRIPTION OF THE PREFERRED EMBODIMENTS

Figure 1:
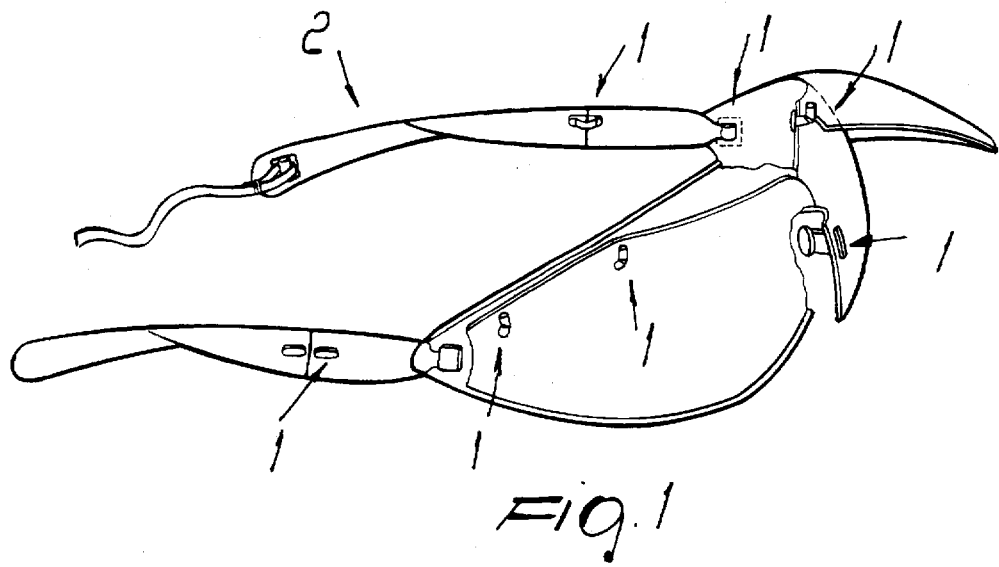
FIG. 1 is a side view of a first embodiment of the device according to the invention.

With reference to the above figures, the reference numeral 1 designates a device for interconnecting and pivoting two components of a pair of glasses 2, sunglasses, corrective eyeglasses, or sports goggles, or of a protective element for sports use, such as for example a helmet 1903.

Figure 2:
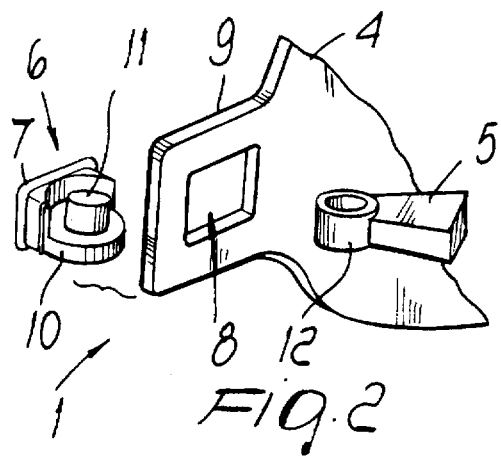
FIG. 2 is a lateral perspective view of the unassembled components of the device.
Figure 3:
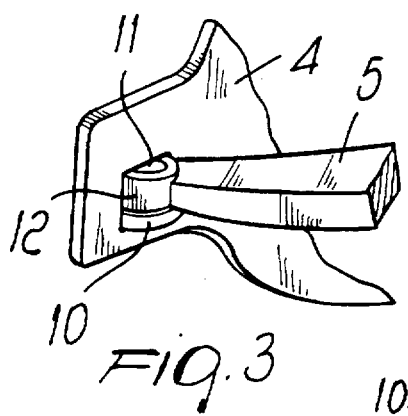
FIG. 3 is a view, as in FIG. 2, of the interconnection of the two components.

Said device can allow, for example, to interconnect a lens 4 and a temple 5; in this case, as shown in FIGS. 2 and 3, the device is constituted by a single body 6 that is made mainly of flexible material, has a head 7 substantially shaped like a parallelepiped and detachably associable at at least one first hole 8 formed in any position of the lens or of one of said two components of the eyeglasses or of a protective element for sports use.

In one of the possible solutions, the first hole 8 is formed, as shown in FIGS. 2 and 3, preferably at an adapted wing 9 protruding perimetrically for example from the lens 4.

A substantially cylindrical tab 10 protrudes from the head 7 of the single body 6 at one side, and a cylindrical pivot 11 protrudes axially from said tab and has an axis that is substantially parallel to the plane of the wing 9 or, in general, parallel to the plane of arrangement of the component, chosen from said two components of the pair of eyeglasses or protective element for sports use, on which the first hole 8 is formed.

A complementarily shaped sleeve 12, formed at the end of the temple 5, can be arranged at the pivot 11.

The dimensions of the tab 10 and of the pivot 11 are such that once the single body 2 and the sleeve 12 have been connected one another, said sleeve partially overlaps a cross-sectional thickness of the wing 9, or of the component, chosen from said two components of the eyeglasses or protective element for sports use, at which the first hole 8 is provided: the connection, in fact, occurs by first inserting the sleeve 12 through the first hole 8, by then coupling the latter to the pivot 11 of the single body 6 and by then inserting by pressure the head 7 inside the first hole 8.

The articulation of the temple 5 is thus allowed, but the extraction of the sleeve 12 is not.

Figure 4:
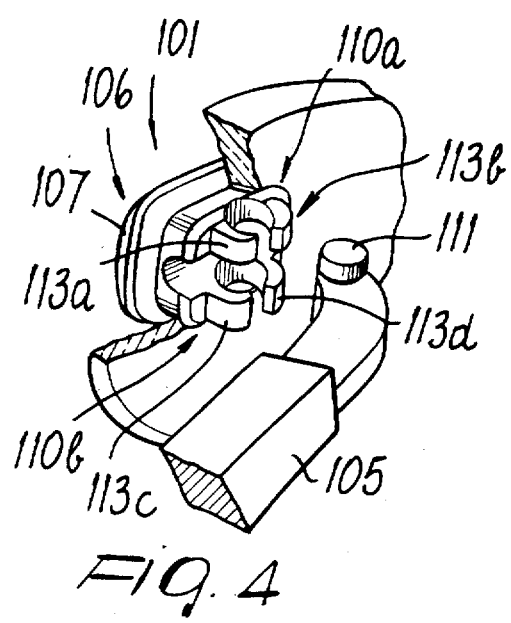
FIG. 4 is a view, as in FIG. 2, of a second embodiment.
Figure 5:
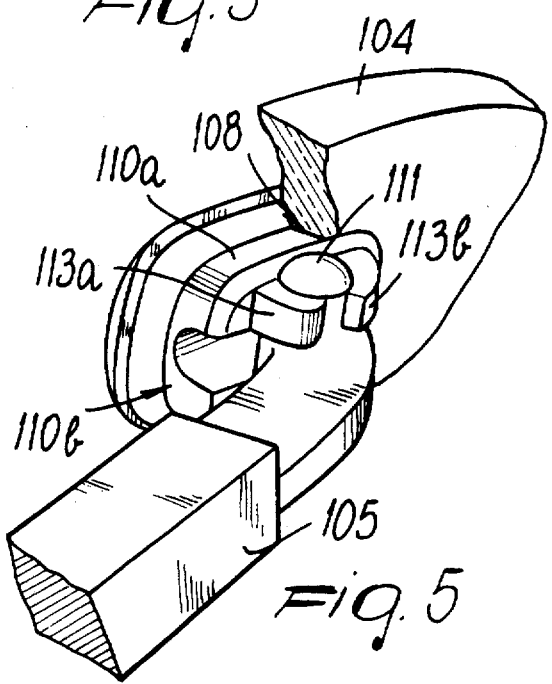
FIG. 5 is a view, as in FIG. 3, of the embodiment of FIG. 4.

As an alternative, FIGS. 4 and 5 illustrate a device 101 in which the single body 106 again has a head 107 from which two tabs 110a and 110b substantially parallel to each other protrude; each tab has two flexible flaps, designated by the reference numerals 113a, 113b, 113c, and 113d, between which an adapted pivot 111, which protrudes transversely at the end of the temple 105, can be located.

In this case, the pair of tabs 110a and 110b has a thickness that is substantially equal to that of the lens 104 at the first hole 108.

In this case, too, the flexing of the single body 106 allows to removably insert said body in the first hole and allows the subsequent interconnection and pivoting of the temple.

Figure 6:
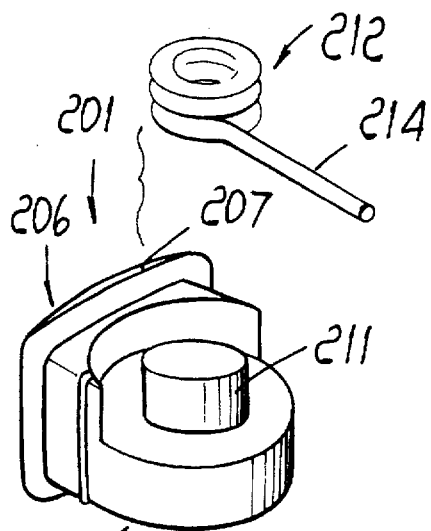
FIG. 6 is a view of a third embodiment of the device.

FIG. 6 illustrates another device 201 that is composed of a single body 206 provided with a head 207 that can be removably inserted at a first hole formed on one of the two components of the eyeglasses or of the protective element for sports use; a tab 210 protrudes from said head and is axially provided with a protruding pivot 211, with which the second component of the eyeglasses or protective element for sports use interacts; said second component is constituted for example by a metal wire 214, one end of which is wound one or more times so as to form a sleeve 212 that is associable coaxially to the pivot 211, and another end of which can constitute the temple or bridge of the eyeglasses.

Figure 7:
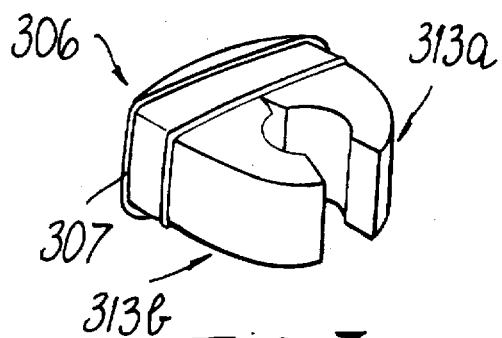
FIG. 7 is a view of a fourth embodiment of the device.

FIG. 7 illustrates a single body 306, which again comprises a head 307 that is removably associable at one of the components of the eyeglasses or of the protective element for sports use and has a single pair of flaps 313a and 313b that are substantially C-shaped and can be divaricated elastically for the detachable connection of the second component of the eyeglasses or protective element for sports use.

Figure 8:
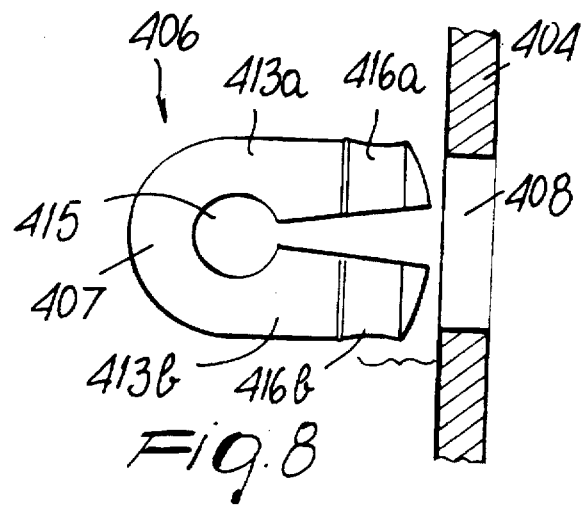
FIG. 8 is a view of a fifth embodiment of the device.

FIG. 8 illustrates a single body 406, from the head of which two flaps 413a and 413b extend; said flaps form, at the head 407, an opening 415 that acts as a seat for one of the components of the eyeglasses or protective element for sports use; the ends of said flaps can be divaricated elastically and can be arranged within a first hole 408 formed on the other component of the eyeglasses or protective element for sports use, such as a lens 404 or other part.

Advantageously, an adapted slot 416a and 416b is formed at the ends of the two flaps 413a and 413b, and its width is substantially equal to the thickness of the lens, so as to allow optimum engagement.

Figure 9:
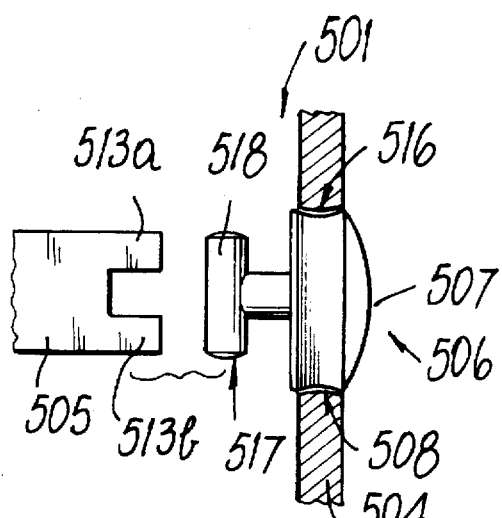
FIG. 9 is a partially sectional side view of a sixth embodiment of the device.
Figure 10:
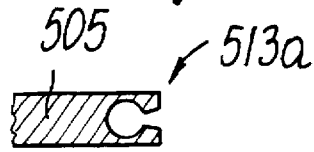
FIG. 10 is a transverse sectional view of a component of the device of FIG. 9.

FIGS. 9 and 10 illustrate a device 501 in which the single body 506 is provided with a head 507 that is preferably shaped like a parallelepiped or a cylinder, and on the perimetric region of which there is a slot 516 whose width is substantially equal to the thickness of a component of the eyeglasses or protective element for sports use, such as for example a lens 504.

Said single body 506 can be arranged at an adapted first hole 508 formed on said lens 504, and a substantially T-shaped stem 517 protrudes axially with respect to the head 507.

Said stem, in turn, has a preferably cylindrical head 518 that is arranged so that its longitudinal axis is substantially parallel to the plane of arrangement of the lens 504; the end of the other component of the eyeglasses or protective element for sports use, such as for example a temple 505, is detachably associable at said head.

The connection between the two components is allowed by virtue of the fact that the end of said temple 505 has two flaps 513a and 513b that can be divaricated elastically for detachable connection to the head 518 of the stem 517.

Figure 11:
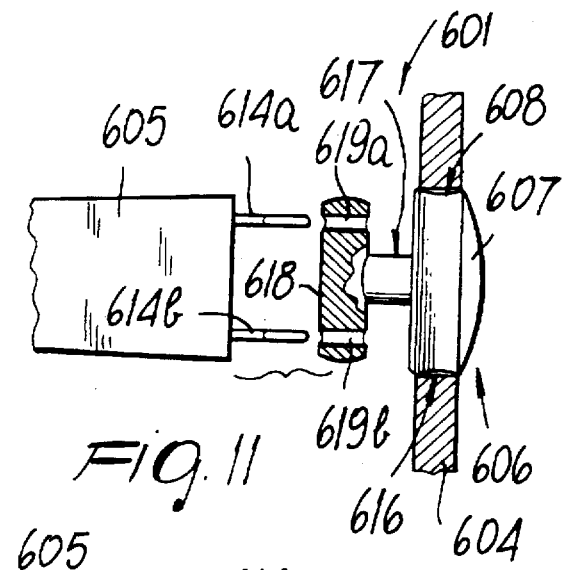
FIG. 11 is a view, as in FIG. 9, of a seventh embodiment of the device.
Figure 12:
FIG. 12 is a view, as in FIG. 10, of one of the components of the device of FIG. 11.

FIGS. 11 and 12 illustrate a device 601 for connecting and pivoting a lens 604 to a temple 605; said device comprises a single body 606 which has a substantially cylindrical head 607; a slot 616 is formed on the perimetric region of said head to anchor said head at an adapted first hole 608 formed on said lens 604.

In this case, too, a stem 617 protrudes from the head 607, and in turn has a head 618 at the ends of which there are annular seats 619a and 619b for temporary engagement means, constituted by two wires 614a and 614b that are made of an appropriate material, are preferably obtained from a mold, and protrude from the end of the temple 605 so as to form a substantially triangular shape in which the vertex forms a circular arc that detachably engages the annular seats 619a and 619b.

Figure 13:
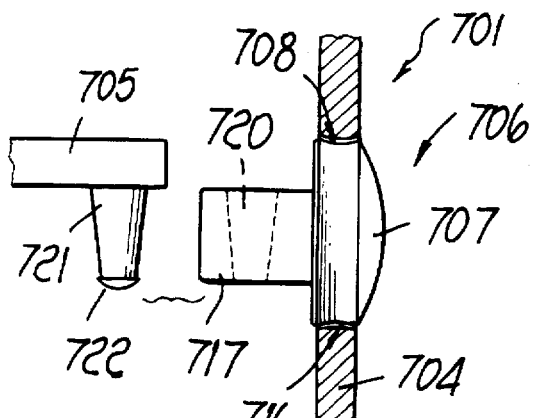
FIG. 13 is a view, as in FIG. 9, of an eighth embodiment of the device.

FIG. 13 illustrates a device 701 for connecting and pivoting for example a lens 704 to a temple 705; said device comprises a single element 706 having a substantially cylindrical head 707, on the perimetric region of which a slot 716 is formed to allow engagement at an adapted first hole 708 formed on said lens 704.

A stem 717 protrudes from the head 707, and a conical seat 720 is formed transversely thereon for temporarily accommodating a complementarily shaped lug 721 that protrudes at right angle at one end of the temple 705.

Advantageously, the lug 721 has, at its free end, a retention element for the stem 717, which is constituted by a mushroom-shaped head 722.

Figure 14:
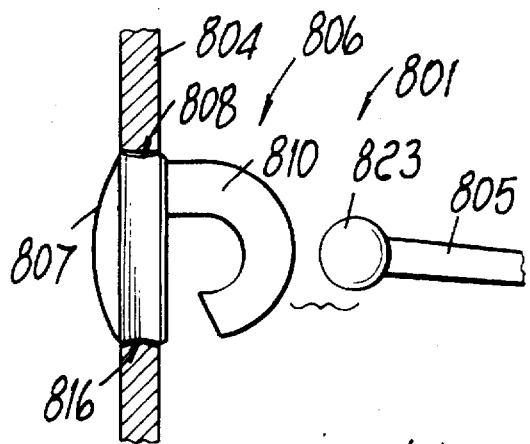
FIG. 14 is a view, as in FIG. 9, of a ninth embodiment of the device.
Figure 15:
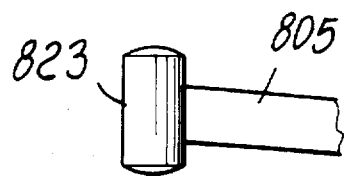
FIG. 15 is another view of one of the components of the device of FIG. 14.

FIGS. 14 and 15 illustrate a device 801 for connecting for example a lens 804 and a temple 805 one another; said device is constituted by a single body 806, which has a preferably cylindrical head 807 on the perimetric region of which a slot 816 is formed to allow to detachably arrange said head at the first hole 808 formed at the lens 804.

A means for temporary engagement with the temple 805 protrudes from the head 807 in an axially offset configuration and is constituted by a J-shaped tab 810, the free end of which is flexible to allow the rotatable and detachable engagement of the tip 823 and of the temple 805, which is preferably cylindrical.

Figure 16:
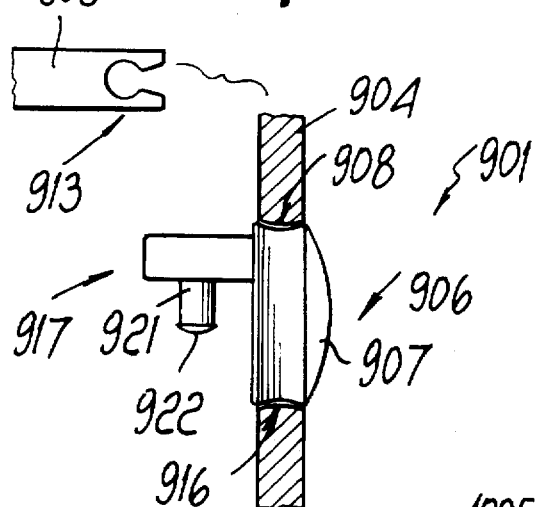
FIG. 16 is a view, as in FIG. 9, of a tenth embodiment of the device.

FIG. 16 illustrates a device 901 for connecting and pivoting for example a lens 904 to a temple 905; said device comprises a single body 906 having a substantially cylindrical head 907 on the perimetric region of which there is a slot 916 for coupling at an adapted and complementarily shaped first hole 908 formed on the lens 904.

A stem 917 protrudes from the head 907 in an axially offset configuration, and a cylindrical lug 921 with a mushroom-shaped head 922 protrudes at right angle to said stem.

The tip of the temple 905 is detachably and rotatably associable at said lug 921 and is shaped so as to have flaps 913 that can be divaricated elastically for rotatable coupling to the lug.

Figure 17:
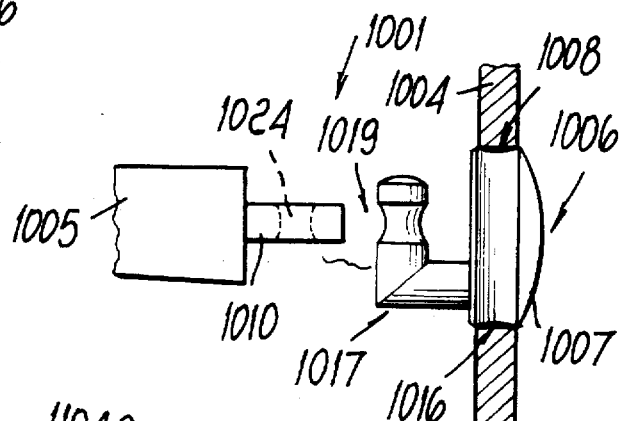
FIG. 17 is a view, as in FIG. 9, of an eleventh embodiment of the device.

FIG. 17 illustrates a device 1001 for connecting and pivoting for example a lens 1004 to a temple 1005; said device is constituted by a single cylindrical body 1006 on the perimetric region of which a slot 1016 is formed for detachable coupling at a complementarily shaped first hole 1008 formed on said lens 1004.

A substantially L-shaped stem 1017 protrudes in an axially offset configuration from the head 1007 of the single element 1006; a seat 1019 is formed proximate to the free end of said stem and allows the detachable and rotatable connection of a tab 1010 that protrudes from a tip of the temple 1005 provided with a second hole 1024 that is shaped complementarily with respect to the seat 1019.

Figure 18:
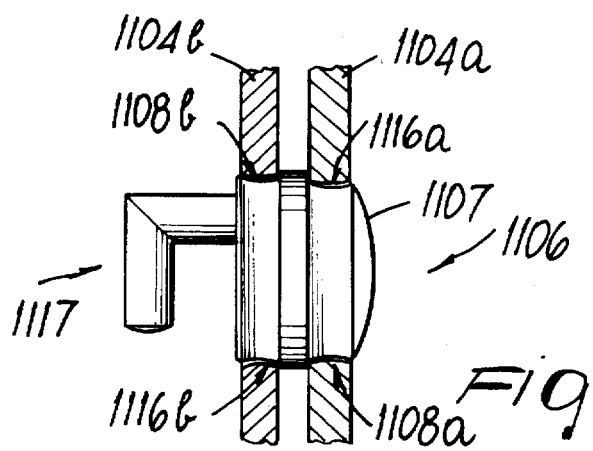
FIG. 18 is a view, as in FIG. 9, of a twelfth embodiment of the device.

FIG. 18 illustrates a single body 1106 which has a substantially cylindrical head 1107 on the perimetric region of which two parallel slots 1116a and 1116b are formed for detachable coupling at adapted first holes 1108a and 1108b formed at two lenses 1104a and 1104b, which are thus arranged substantially parallel to each other.

A substantially L-shaped stem 1117 preferably protrudes from the head 1107 and acts as a temporary engagement means for the other component of the eyeglasses or protective element for sports use.

Figure 19:
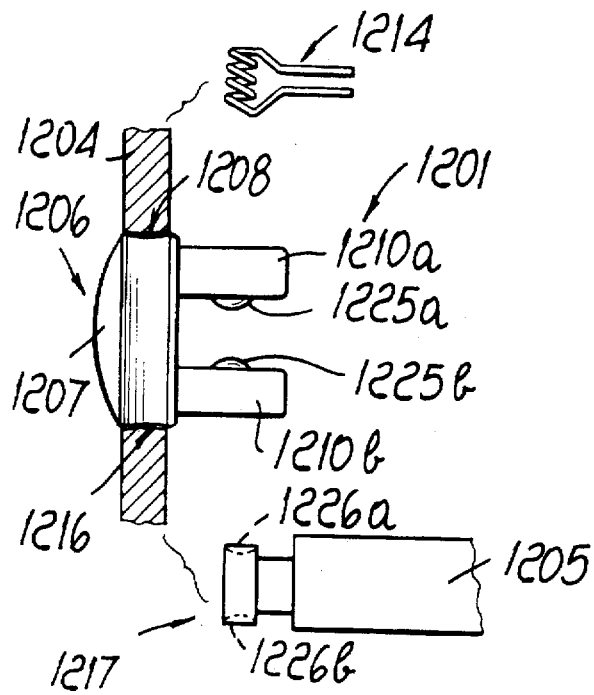
FIG. 19 is a view, as in FIG. 9, of a thirteenth embodiment of the device.

FIG. 19 illustrates a device 1201 constituted by a single body 1206 that has a preferably cylindrical head 1207 at the perimetric rim of which there is a slot 1216 for detachable engagement at a first hole 1208 formed at a lens 1204.

Two substantially parallel tabs 1210a and 1210b protrude from the head 1207; the facing surfaces of each tab have a spherical dome-shaped protrusion 1225a and 1225b.

Said protrusions have the same axis, and it is possible to interpose between them for example an adapted stem 1217 that protrudes from the end of a temple 1205, for example; said stem is T-shaped, and adapted complementarily shaped spherical dome-shaped seats, designated by the reference numerals 1226a and 1226b, are formed at the ends of the head of said stem.

FIG. 19 also illustrates a different means for connection to the other component of the eyeglasses or protective element for sports use, which is constituted by a wire 1214 that is variously wound in a spiral, so as to allow to detachably interpose it between the protrusions 1225a and 1225b.

The interspace between the tabs and said seats is of course such as to allow detachable and rotatable arrangement of the two components.

Figure 20:
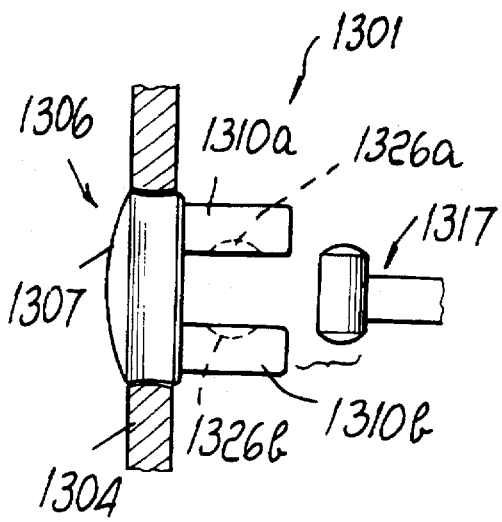
FIG. 20 is a view, as in FIG. 9, of a fourteenth embodiment of the device.

FIG. 20 illustrates a device 1301 comprising a single body 1306; the head 1307 of said single body is detachably associated with one of the components of the eyeglasses or protective element for sports use, such as for example a lens 1304, and two tabs 1310a and 1310b protrude from said head 1307.

Mutually facing spherical dome-shaped seats, designated by the reference numerals 1326a and 1326b, are formed between said tabs and are arranged substantially parallel to each other.

The substantially T-shaped stem 1317, associated with the end of the second component of the eyeglasses or protective element for sports use, is detachably associable between said seats, and the ends of its head are shaped complementarily with respect to the spherical dome-shaped seats.

Figure 21:
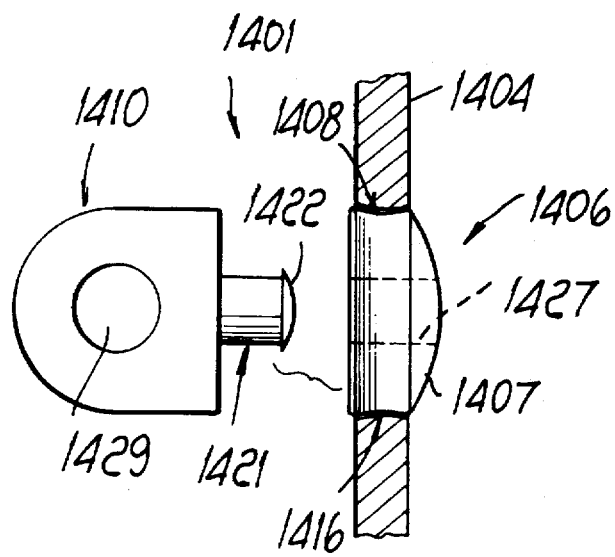
FIG. 21 is a view, as in FIG. 9, of a fifteenth embodiment of the device.

FIG. 21 illustrates a device 1401 that is constituted by a single body 1406 provided with a preferably cylindrical head 1407, on the perimetric region of which a slot 1416 is formed for detachable engagement at a complementarily shaped first hole 1408 formed on a lens 1404.

Said head 1407 is provided with a third through axial hole 1427.

The single body 1406 is furthermore constituted by a base or tab 1410, from which a lug 1421 protrudes; said lug is shaped complementarily to the third hole 1427, can be positioned and temporarily locked thereat, and has a mushroom-shaped head 1422.

A fourth hole 1429 is formed at the tab 1428 for detachable and rotatable connection to the other component of the eyeglasses or protective element for sports use.

Figure 22:
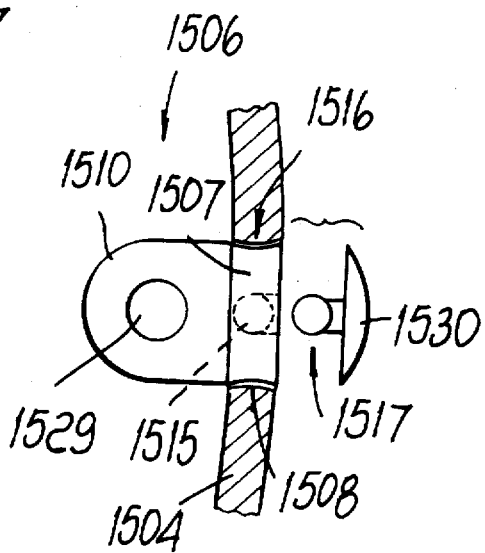
FIG. 22 is a view, as in FIG. 9, of a sixteenth embodiment of the device.

FIG. 22 illustrates a single body 1506 provided with a preferably cylindrical head 1507 on the perimetric region of which a slot 1516 is provided for detachable connection at a first hole 1508 formed on a lens 1504.

An opening 1515 is provided on the head 1507 and forms a seat for the complementarily shaped stem 1517 of a plug 1530 that is adapted to allow mutual temporary connection of the single body 1506 and of the lens 1504.

The body 1506 has, on the opposite side with respect to the opening 1515, a tab 1510 at which a fourth hole 1529 is formed for detachable and rotatable connection to another component of the eyeglasses or protective element for sports use.

FIGS. 23 and 24 illustrate a device 1601 constituted by a single body 1606 having a head 1607 on the perimetric region of which there is a slot 1616 for temporary coupling at a first hole 1608 formed at a lens 1604.

A stem 1617 protrudes from the head 1606 and has, at its end, a spherical element 1631 that temporarily rotatably engages at a complementarily shaped seat 1632 formed at one end of the other component of the eyeglasses or protective element for sports use, such as for example a temple 1605.

Said seat 1632 gives the end of the temple the shape of a flap that can be divaricated elastically so as to allow insertion of the spherical element 1631 and mutual rotation, which is facilitated by the presence of an adapted guide 1633 that is formed on the head 1607 and is shaped complementarily to the tip of the temple 1605.

FIGS. 25, 26, and 27 illustrate a device 1701 that comprises a body 1706 constituted by two flaps 1734a and 1734b, which are pivoted one another, at one end, by means of a second pivot 1735; each flap has, at the other end, annular seats 1719a and 1719b for detachable connection at adapted first holes 1708a and 1708b formed on two lenses 1704a and 1704b that can be joined one another at the region above the nose pad.

FIGS. 28 and 29 illustrate a device 1801 for connecting one another a first lens 1804a and a second lens 1804b that can be selectively positioned in front of the first one.

Said device comprises a single body 1806 constituted by a block 1836 that is detachably associable at an adapted fifth hole 1838 formed on the front 1837 of the eyeglasses 1802.

A hook-shaped tab 1810 protrudes from the block 1836 and affects a first hole 1808 formed on the lens 1804a and, at the end, a sixth hole 1839 formed on the other lens 1804b, which can thus slide along said tab until it is adjacent to the front or above it.

One or more adapted rings 1840, arranged coaxially to the tab 1810, are provided to allow to selectively position the second lens 1804b with respect to the first lens 1804a.

FIG. 30 illustrates a helmet 1903, with which a plurality of devices 1901 are associated; said devices are adapted to allow the interconnection and pivoting of two separate components, such as for example a structure 1941 that surrounds the head of the user, a peak 1942, a single lens 1943, a chin-rest 1944, a nape protector 1945, and a shield 1946.

The invention is of course susceptible of numerous further modifications and variations, all of which are within the scope of the same inventive concept.

Thus, the materials and the dimensions constituting the individual components of the device may also be the most pertinent according to the specific requirements.

What is claimed is:

1. An interconnecting device which pivotally connects a first eyeglasses component to a second eyeglasses component, said first eyeglasses component comprising a substantially planar portion having mutually opposite first and second surfaces, a hole being provided in said planar portion which extends completely through said planar portion from the first surface to the second surface, said interconnecting device comprising:

a single body element which is removably lodged in said hole of said planar portion by means of an elastic deformation of engaging surfaces of at least one of said single body element and said hole of said planar portion;

a first pivot element connected to said single body; and a second pivot element connected to said second component;

wherein said second pivot element and said first pivot element are mutually pivotally connected to form a pivot connection of the interconnecting device, said pivot connection having a pivot axis and said first eyeglasses component being pivotally connected with respect to said second eyeglasses component exclusively about said pivot axis;

and wherein said pivot connection is positioned adjacent said hole such that an axis extending through said hole in a direction substantially perpendicular to the planar portion of said first eyeglasses component intersects said pivot axis of said pivot connection.

2. The interconnecting device of claim 1 wherein said pivot axis extends substantially parallel to said planar portion of said first component and substantially perpendicular to said axis extending through said hole.

3. The interconnecting device of claim 1 wherein said axis extends centrally through said hole.

4. The interconnecting device of claim 1 wherein said pivot connection is arranged at least partially inside said hole.

5. The interconnecting device of claim 1 wherein said first eyeglasses component is a lens and wherein said second eyeglasses component is an essentially rigid temple.

6. The interconnecting device of claim 5 wherein said planar portion comprises a wing of said lens.

7. The interconnecting device of claim 1 wherein said single body comprises a head which is releasably fitted inside said hole, said head having an external surface having a configuration which corresponds to a configuration of an internal surface of said hole.

8. The interconnecting device of claim 7 wherein said internal surface has a convex configuration and wherein said external surface has a concave configuration.

9. The interconnecting device of claim 7 wherein said first pivot element comprises a cylindrical pivot (11) connected to said head (7) of said single body (6) and wherein said second pivot element comprises a sleeve (12) fitted over said cylindrical pivot and connected to an end of said second component.

10. The interconnecting device of claim 9 wherein at least a portion of said sleeve (12) is arranged in said hole (8).

11. The interconnecting device of claim 7 wherein said first pivot element comprises a pair parallel tabs (110a, 110b) protruding from said head (107) each of which comprises a pair of flexible flaps (113), and wherein said second pivot element comprises a pivot (111) connected to an end of said second component and lodged between the flaps of said tabs.

12. The interconnecting device of claim 7 wherein said first pivot element, comprises a cylindrical pivot (211) connected to said head (207) of said single body (206) and wherein said second pivot element comprises a metal wire (214) having a wound end forming a sleeve (212) fitted over said cylindrical pivot and having another end connected to an end of said second component.

13. The interconnecting device of claim 7 wherein said first pivot element comprises a pair of flaps (313) protruding from said head (307) which are adapted to be elastically divaricated for detachable connection to said second pivot element.

14. The interconnecting device of claim 7 wherein said first pivot element comprises a T-shaped stem (517) protruding axially from said head (507) and having a cylindrical head (518) having a longitudinal taxis extending parallel to said planar portion, and wherein said second pivot element comprises a pair of elastically divaricatable flaps (513) pivotally fitted on said cylindrical head.

15. The interconnecting device of claim 7 wherein said first pivot element comprises a T-shaped stem (617) protruding axially from said head (607) and having a cylindrical head (618) having a longitudinal axis extending parallel to said planar portion, a pair of annular seats (619) being provided at ends of said cylindrical head, and wherein said second pivot element comprises a pair of wires (614) each having a circular arc portion which detachably fits on a respective seat of said annular seats.

16. The interconnecting device of claim 7 wherein said first pivot element comprises a stem (717) protruding from said head (707) and provided with a conical seat (720) extending completely through said stem, and wherein said second pivot element comprises a conically shaped lug (721) rotatably fitted in said conical seat, said lug having a mushroom-shaped head (722) for retaining said lug in said seat.

17. The interconnecting device of claim 7 wherein said first pivot element comprises a J-shaped flexible tab (810) protruding from said head (807), and wherein said second pivot element comprises a cylindrical tip (823) pivotally connected to said tab.

18. The interconnecting device of claim 7 wherein said first pivot element comprises an axially offset stem (917) protruding from said head (907) and a cylindrical lug (921) with a mushroom-shape head (922) protruding perpendicularly from said stem, and wherein said second pivot element comprises a elastically divaricatable flap (913) pivotally connected to said lug.

19. The interconnecting device of claim 7 wherein said first pivot element comprises an axially offset L-shaped stem (1017) protruding from said head (1007) and having an annular seat (1019), and wherein said second pivot element comprises tab (1010) with a hole (1024) shaped complimentarily to said annular seat and pivotally fitted thereto.

20. The interconnecting device of claim 7 wherein said head (1107) comprises a pair of perimetric parallel slots (1116) lodged in a pair of parallel holes (1108), and wherein said first pivot element comprises an L-shaped stem protruding from said head.

21. The interconnecting device of claim 7 wherein said first pivot element comprises a pair of parallel tabs (1210) protruding from said head (1207) each having a centrally facing dome-shaped protrusion (1225), and wherein said second pivot element comprises a T-shaped stem (1217) with a cylindrical head having dome-shaped seats (1226) at ends of the head rotatably fitted with the dome-shaped protrusions.

22. The interconnecting device of claim 7 wherein said first pivot element comprises a pair of parallel tabs (1210) protruding from said head (1207) each having a centrally facing dome-shaped protrusion (1225), and wherein said second pivot element comprises a spiral shaped wire (1214) fitted between the dome-shaped protrusions.

23. The interconnecting device of claim 7 wherein said first pivot element comprises a pair of parallel tabs (1310) protruding from said head (1307) each having a centrally facing dome-shaped seats (1326), and wherein said second pivot element comprises a T-shaped stem (1317) with a cylindrical head having dome-shaped protrusions (1226) at ends of the head rotatably fitted with the dome-shaped seats.

24. The interconnecting device of claim 7 wherein said first pivot element comprises a tab (1410) provided with a protruding lug (1421) fitted in a through hole (1427) provided in said head (1407), said tab also being provided with a cylindrical through hole (1429) for pivotal connection with said second pivot element.

25. The interconnecting device of claim 7 wherein said first pivot element comprises a tab (1510) extending from said head (1507) and being provided with a cylindrical through hole (1529) for pivotal connection with said second pivot element, said head being provided with a seat (1515) in which a stem (1517) of a plug (1530) is accommodated.

26. The interconnecting device of claim 7 wherein said first pivot element comprises a spherical element (1631) provided at an end of a stem (1617) protruding from said head (1607), and an arcuate surface (1633) provided on said head, and wherein said second pivot element comprises a spherical seat (1632) provided in said second component in which said spherical element is pivotally accommodated, and an end surface of said second component which is guided in said arcuate surface.

27. The interconnecting device of claim 1 wherein said single body (406) comprises a pair of flaps (416) which are elastically divaricatable for arrangement in said hole (408), and wherein said first pivot element comprises a cylindrical opening (415) in the form of a seat for pivotally accommodating said second pivot element.

* * * * *